(12) United States Patent
Kato et al.

(10) Patent No.: US 10,629,197 B2
(45) Date of Patent: Apr. 21, 2020

(54) VOICE PROCESSING SYSTEM AND VOICE PROCESSING METHOD FOR PREDICTING AND EXECUTING AN ASK-AGAIN REQUEST CORRESPONDING TO A RECEIVED REQUEST

(71) Applicant: TOYOTA JIDOSHA KABUSHIKI KAISHA, Toyota-shi, Aichi-ken (JP)

(72) Inventors: Sei Kato, Kawasaki (JP); Junichi Ito, Nagoya (JP); Takuma Minemura, Hasuda (JP); Junya Masui, Nissin (JP); Toshiyuki Namba, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/409,943

(22) Filed: Jan. 19, 2017

(65) Prior Publication Data

US 2017/0263250 A1 Sep. 14, 2017

(30) Foreign Application Priority Data

Mar. 8, 2016 (JP) .................................. 2016-044653

(51) Int. Cl.
*G10L 15/22* (2006.01)
*G10L 15/18* (2013.01)
*G10L 15/02* (2006.01)

(52) U.S. Cl.
CPC .............. *G10L 15/22* (2013.01); *G10L 15/02* (2013.01); *G10L 15/18* (2013.01); *G10L 15/1815* (2013.01); *G10L 2015/221* (2013.01); *G10L 2015/223* (2013.01)

(58) Field of Classification Search
CPC ......... G10L 15/08; G10L 15/22; G10L 15/26; G10L 15/285; G10L 2015/223; G10L 15/1815; G06F 17/2795; G06F 17/30442; G06F 17/30646
USPC ........ 704/236, 251, 252, 270, 275; 707/750, 707/759, 764, 765, 768
See application file for complete search history.

(56) References Cited

U.S. PATENT DOCUMENTS 7,275,033 B1* 9/2007 Zhao ..................... G10L 15/197
704/255
7,353,176 B1 4/2008 Baray et al.
(Continued)

FOREIGN PATENT DOCUMENTS

JP 2007-272463 A 10/2007
JP 2009-237786 A 10/2009

*Primary Examiner* — Martin Lerner
(74) *Attorney, Agent, or Firm* — Oliff PLC

(57) ABSTRACT

A voice processing system includes a voice acquisition unit that acquires an utterance of a user, a voice recognition unit that recognizes contents of the utterance acquired by the voice acquisition unit, an execution unit that executes processing based on a result of the voice recognition unit, and a determination unit that determines a candidate of a word to substitute a certain word. When the voice recognition unit recognizes a request including a first word, the execution unit executes the request including the first word and provides the user with a processing result. The determination unit determines a second word that is a substitute candidate of the first word. The execution unit also executes a request including the second word instead of the first word and stores a processing result in a storage unit.

11 Claims, 4 Drawing Sheets

| 231 | 232 | 233 | 234 |
|---|---|---|---|
| WORD BEFORE SUBSTITUTION | WORD AFTER SUBSTITUTION | CONTEXT INFORMATION | NUMBER OF OCCURRENCES |
| SHIBUYA | YOKOHAMA | RETRIEVAL OF STORE (RESTAURANT) | 10 |
| ITALIAN CUISINE | FRENCH CUISINE | RETRIEVAL OF STORE (RESTAURANT) | 8 |
| ... | ... | ... | ... |

230

(56) References Cited

U.S. PATENT DOCUMENTS

| | | | |
|---|---|---|---|
| 7,720,721 B1* | 5/2010 | Goldstein | G06Q 30/02 705/26.1 |
| 7,912,726 B2* | 3/2011 | Alshawi | G10L 15/26 704/270.1 |
| 8,036,877 B2 | 10/2011 | Treadgold et al. | |
| 8,285,738 B1* | 10/2012 | Upstill | G06F 17/27 704/10 |
| 8,515,752 B1 | 8/2013 | Franz et al. | |
| 8,538,984 B1* | 9/2013 | Mahabal | G06F 17/30442 707/769 |
| 8,812,518 B1* | 8/2014 | Popovici | G06F 17/30646 707/748 |
| 2003/0233230 A1* | 12/2003 | Ammicht | G10L 15/183 704/235 |
| 2004/0172254 A1* | 9/2004 | Sharma | G10L 15/26 704/270.1 |
| 2007/0233663 A1 | 10/2007 | Ami et al. | |
| 2008/0046230 A1* | 2/2008 | Hiraiwa | G06F 17/28 704/3 |
| 2008/0134038 A1* | 6/2008 | Oh | G06F 17/30867 715/727 |
| 2009/0138262 A1* | 5/2009 | Agarwal | G06F 17/30746 704/235 |
| 2009/0287680 A1* | 11/2009 | Paek | G06F 17/3064 |
| 2010/0114944 A1* | 5/2010 | Adler | G10L 13/027 707/770 |
| 2013/0080162 A1* | 3/2013 | Chang | G10L 15/34 704/235 |
| 2013/0103405 A1* | 4/2013 | Namba | G10L 15/1822 704/275 |
| 2014/0039895 A1* | 2/2014 | Aravamudan | G10L 15/187 704/257 |
| 2014/0143223 A1* | 5/2014 | Shi | G06F 17/3064 707/706 |
| 2015/0066478 A1* | 3/2015 | Onishi | G06F 17/27 704/9 |
| 2015/0161198 A1* | 6/2015 | Clift | G06F 17/30265 707/705 |
| 2015/0179170 A1* | 6/2015 | Sarikaya | G10L 15/22 704/275 |
| 2015/0302012 A1* | 10/2015 | Bhagat | G06F 17/30646 707/734 |
| 2015/0339290 A1* | 11/2015 | Mueller | G06F 17/2785 704/9 |
| 2015/0340033 A1* | 11/2015 | Di Fabbrizio | G10L 15/18 704/254 |
| 2015/0370787 A1* | 12/2015 | Akbacak | G10L 15/06 704/2 |
| 2016/0148610 A1* | 5/2016 | Kennewick, Jr. | G10L 15/18 704/240 |
| 2016/0253418 A1* | 9/2016 | Sharma | G06F 17/3064 707/767 |
| 2016/0351194 A1* | 12/2016 | Gao | G10L 15/26 |
| 2017/0193111 A1* | 7/2017 | Tandiono | G10L 15/26 |
| 2019/0371302 A1* | 12/2019 | Watanabe | G10L 15/1822 |
| 2019/0371305 A1* | 12/2019 | Watanabe | G06F 17/277 |

* cited by examiner

FIG. 2

| WORD BEFORE SUBSTITUTION | WORD AFTER SUBSTITUTION | CONTEXT INFORMATION | NUMBER OF OCCURRENCES |
|---|---|---|---|
| SHIBUYA | YOKOHAMA | RETRIEVAL OF STORE (RESTAURANT) | 10 |
| ITALIAN CUISINE | FRENCH CUISINE | RETRIEVAL OF STORE (RESTAURANT) | 8 |
| ... | ... | ... | ... |

230

VOICE PROCESSING SYSTEM AND VOICE PROCESSING METHOD FOR PREDICTING AND EXECUTING AN ASK-AGAIN REQUEST CORRESPONDING TO A RECEIVED REQUEST

CROSS-REFERENCE TO RELATED APPLICATION

This application claims priority to and the benefit of Japanese Patent Application No. 2016-044653, filed on Mar. 8, 2016, the entire contents of which are incorporated herein by reference.

BACKGROUND OF THE INVENTION

Field of the Invention

The present invention relates to a voice processing system and, particularly, to a voice processing system capable of responding at high speed to an ask-again from a user.

Description of the Related Art

With progress made in voice recognition technology, there has been an increase in use of a voice user interface in a vehicle space. On the other hand, a vehicle space is a noisy environment and robust recognition in noise is required. In addition, it is desired that a system be constructed which is premised on ask-agains occurring a number of times.

In this case, an "ask-again" refers to an utterance "What about B instead of A?" following a request made for A. For example, an utterance such as "What about Yokohama instead of Shibuya?" or "Retrieve French restaurants instead of Italian restaurants" following a request for "Retrieve Italian restaurants near Shibuya" corresponds to an "ask-again".

U.S. Pat. Nos. 7,353,176, 8,036,877, and 8,515,752 disclose comprehending contents of an ask-again in consideration of its context and appropriately processing the ask-again.

However, U.S. Pat. Nos. 7,353,176, 8,036,877, and 8,515,752 are mainly aimed at making it possible to respond to ask-agains and do not disclose facilitating processing of an ask-again.

SUMMARY OF THE INVENTION

An object of the present invention is to enable a voice processing system to respond at high speed to a request by an ask-again.

A voice processing system according to the present invention includes: a voice acquisition unit that acquires an utterance of a user; a voice recognition unit that recognizes contents of the utterance acquired by the voice acquisition unit; an execution unit that executes processing based on a result of the voice recognition unit; and a determination unit that determines a candidate of a word to substitute a certain word. In addition, when the voice recognition unit recognizes a request including a first word, the execution unit executes the request including the first word and provides the user with a processing result, the determination unit determines a second word that is a substitute candidate of the first word, and the execution unit also executes a request including the second word instead of the first word and stores a processing result in a storage unit.

In the present invention, favorably, when the voice recognition unit recognizes the request including the second word instead of the first word after recognizing the request including the first word, the execution unit acquires the processing result stored in the storage unit and provides the user with the processing result.

As described above, by determining a word pair to be a candidate of an ask-again with the determination unit, executing processing related to the candidate of the ask-again in advance, and storing a result thereof, processing time when an ask-again which substitutes the first word with the second word actually occurs can be shortened.

In the present invention, after acquiring a request including a certain word from the user, the determination unit may store the number of times a request including another word instead of the certain word has been acquired from the user for each pair of the certain word and the other word, and determine a word of which the number of times is equal to or larger than a threshold among words each forming a pair with an input word, as a substitute candidate of the input word. In this case, the "number of times a request including another word instead of the certain word has been acquired from the user" can be interpreted as the number of times an utterance instructing the request including another word instead of the certain word to be made has been acquired. In other words, favorably, the determination unit stores the number of ask-agains such as "What about B instead of A?" after a request is made for A with respect to a pair formed by the words A and B. Moreover, the number stored by the determination unit need not necessarily be determined solely based on contents of actual utterances of a user, and the number may be set large in advance for a word pair for which a high frequency of ask-agains is expected.

Alternatively, in the present invention, the determination unit may store a certain word and a substitute candidate of the certain word in association with each other and determine a word stored in association with an input word as a substitute candidate of the input word. In addition, the determination unit may determine a similarity of a word based on a vocabulary dictionary and determine a word that is similar to an input word as a substitute candidate. In any case, a substitute candidate is favorably determined by also taking context in an utterance into consideration.

In addition, in the present invention, favorably, when the user utters the request including the second word instead of the request including the first word after making the request including the first word, the voice recognition unit determines an attribute of the second word from context information of the request including the first word and recognizes the second word.

Although a same word may have different meanings depending on the context, when a request including a second word is uttered instead of a request including a first word, it is assumed that the first word and the second word have a same attribute. Therefore, by taking context information of a request including the first word into consideration, an attribute of the second word can be accurately determined and the second word can be accurately recognized.

According to the present invention, a voice processing system can respond at high speed to a request by an ask-again.

Further features of the present invention will become apparent from the following description of exemplary embodiments with reference to the attached drawings.

BRIEF DESCRIPTION OF THE DRAWINGS

FIG. 2 is a diagram showing an example of a word pair storage unit according to an embodiment;

DESCRIPTION OF THE EMBODIMENT

Hereinafter, an exemplary embodiment of the present invention will be described with reference to the drawings. It is to be understood that the following description simply represents an example of the present invention and that the present invention is not limited to the embodiment described below.

<Ask-again>

Before describing a voice processing system according to the present embodiment, an "ask-again" will be described. Let us assume a situation where contents of an utterance by a user constitute some kind of processing request with respect to the voice processing system. For example, let us consider a situation where a request to "Retrieve an Italian restaurant near Shibuya" is made. When the user subsequently makes a request to "Retrieve an Italian restaurant near Yokohama", the user may conceivably utter "What about Yokohama instead of Shibuya?". In the present specification, an utterance such as "What about B instead of A?" which is made after a request or an instruction including a certain word A as in the case described above will be referred to as an "ask-again". In the example described above, an ask-again which replaces "Italian" with "French" is conceivable in addition to an ask-again which replaces the word "Shibuya". In other words, the number of conceivable patterns of ask-agains equals the number of words included in a given request.

<System Configuration>

Figure 1:
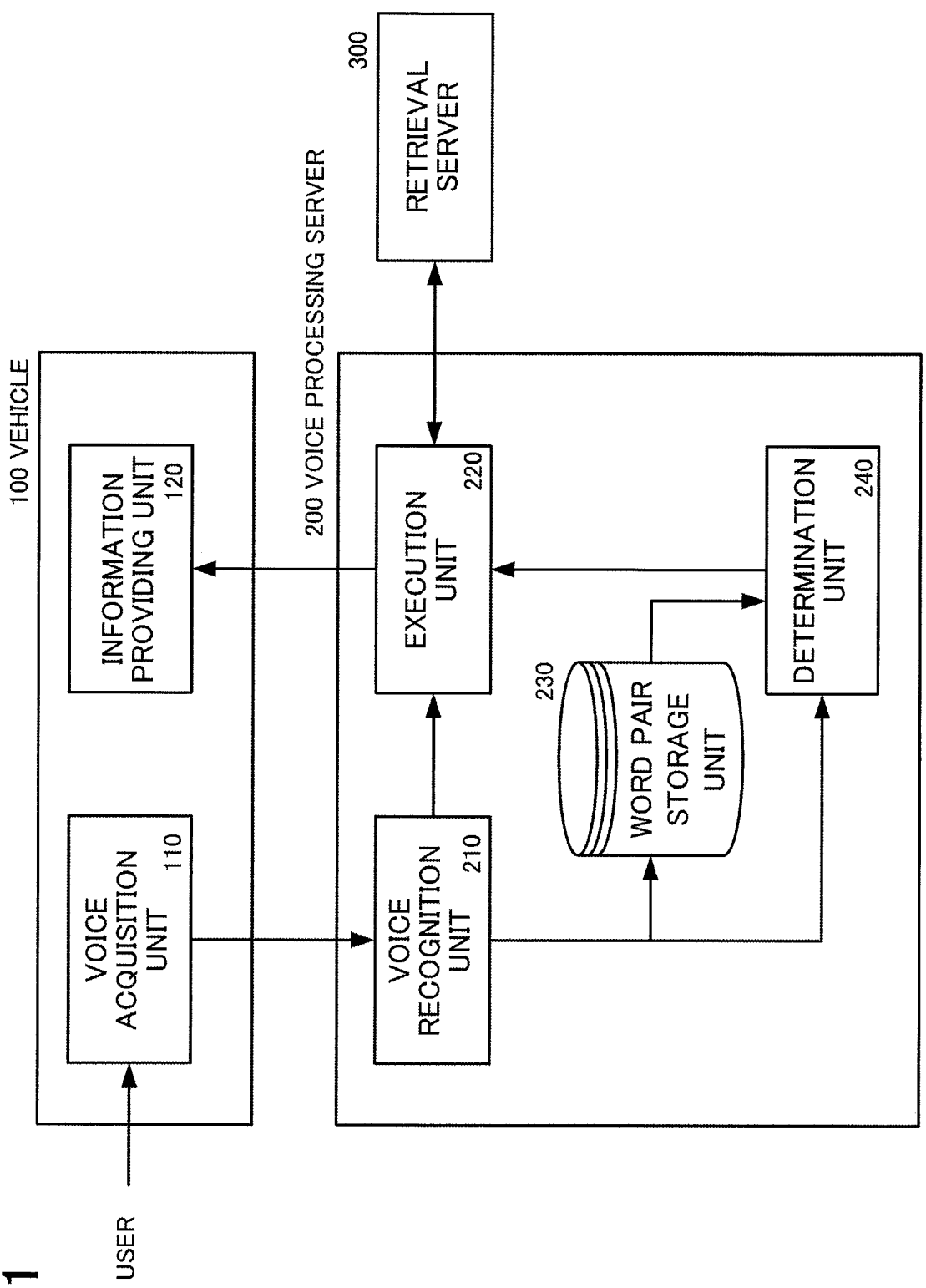
FIG. 1 is a diagram showing an example of a configuration of a voice processing system according to an embodiment.

FIG. 1 is a diagram showing a system configuration of a voice processing system according to the present embodiment. The voice processing system according to the present embodiment is a system in which an utterance by a user in a vehicle 100 is recognized by a voice processing server 200, processing in accordance with contents of the utterance is executed, and the user in the vehicle 100 is provided with a processing result.

The vehicle 100 is constituted by an information processing apparatus (a computer) including a voice acquisition unit 110 and an information providing unit 120. The information processing apparatus includes a computing apparatus, a storage apparatus, an input/output apparatus, and the like, whereby the following functions are realized as the computing apparatus executes a program stored in the storage apparatus.

The voice acquisition unit 110 is constituted by one or a plurality of microphones or microphone arrays and acquires voice generated by a user. The voice acquired by the voice acquisition unit 110 is transmitted to the voice processing server 200 by wireless communication. Moreover, the voice acquisition unit 110 need not transmit the acquired voice to the voice processing server 200 as-is and may acquire a feature amount of the voice and only transmit the feature amount. The information providing unit 120 is an apparatus used by the vehicle 100 to provide a user with information acquired from the voice processing server 200 and is constituted by an image display apparatus, a voice output apparatus, or the like.

The voice processing server 200 is constituted by an information processing apparatus (a computer) including a voice recognition unit 210, an execution unit 220, a word pair storage unit 230, and a determination unit 240. The information processing apparatus includes a computing apparatus, a storage apparatus, an input/output apparatus, and the like, whereby the following functions are realized as the computing apparatus executes a program stored in the storage apparatus.

The voice recognition unit 210 is a functional unit for recognizing voice transmitted from the voice acquisition unit 110 of the vehicle 100 and comprehending contents (a text) and a meaning of the voice. The voice recognition unit 210 performs voice recognition based on a vocabulary dictionary or a language model. As a specific voice recognition method, arbitrary existing methods can be used. While the voice recognition unit 210 is depicted as only acquiring voice from a single vehicle 100 in the drawing, voices may alternatively be acquired from a large number of vehicles 100 to be recognized.

Moreover, when recognizing an utterance of an ask-again, the voice recognition unit 210 favorably recognizes the utterance by determining an attribute or the like of a word included in the ask-again in accordance with a context of contents of an utterance prior to the ask-again. Since a word substituted in an ask-again is a word used in a same context, a word included in an ask-again can be more accurately recognized using context information.

The execution unit 220 is a functional unit which executes processing in accordance with a result of voice recognition by the voice recognition unit 210. For example, when an utterance by the user is a request for acquiring information satisfying prescribed conditions, the execution unit 220 acquires information satisfying the conditions from a retrieval server 300 and transmits the information to the vehicle 100.

When a request is received from the user, the execution unit 220 estimates an assumed ask-again, executes processing in accordance with a request of the estimated ask-again, and stores a processing result in a storage unit (not shown). In other words, the execution unit 220 prefetches a result of a request of the estimated ask-again. In addition, when an ask-again is actually received from the user, if a result thereof has already been prefetched, the result is transmitted to the vehicle 100. Furthermore, when an ask-again occurs, the execution unit 220 records, in the word pair storage unit 230, which word had been substituted by which word. Details of the processing will be described later.

The word pair storage unit 230 stores the number of occurrences of a pair formed by a word before substitution and a word after substitution in an ask-again. FIG. 2 is a diagram showing a table configuration of the word pair storage unit 230. The word pair storage unit 230 stores a word before substitution 231, a word after substitution 232, context information 233, and the number of occurrences 234. The word before substitution 231 is a word before being substituted in an ask-again and the word after substitution 232 is a word after being substituted in the ask-again. Context information 233 refers to information for specifying a context in an utterance. The number of occurrences 234 represents the number of occurrences of an ask-again in which the word before substitution 231 has been substituted by the word after substitution 232 in the context specified by the context information 233.

Moreover, the number of occurrences in the word pair storage unit 230 need not be determined solely based on ask-agains that have actually occurred. For example, when an ask-again of "What about B instead of A?" occurs after a request to "Retrieve A" is made, the number of occurrences of an ask-again which substitutes the word A with the word B is incremented. In doing so, the number of occurrences of an ask-again which substitutes the word B with the word A may be incremented. In addition, when an ask-again of "What about C?" is successively made, the number of occurrences of an ask-again which substitutes the word A with the word C is incremented. At this point, besides an ask-again which substitutes the word A with the word C, the number of occurrences of an ask-again which substitutes the word B with the word C, the number of occurrences of an ask-again which substitutes the word C with the word A, and the number of occurrences of an ask-again which substitutes the word C with the word B may be incremented. This is because, when an ask-again occurs, words that are objects of the ask-again are conceivably mutually substitutable.

The determination unit 240 is a functional unit which, when an utterance by the user is acquired, estimates an ask-again of the utterance by the user. The determination unit 240 estimates which word is to be substituted by which word in the ask-again by referring to the word pair storage unit 230. Specifically, the determination unit 240 refers to the word pair storage unit 230 and estimates that a word pair which is included in an utterance of the user and of which the number of occurrences in the context of the utterance is equal to or larger than a threshold is a word pair that is substituted in an ask-again. When there are a plurality of word pairs of which the number of occurrences is equal to or larger than the threshold, the determination unit 240 may select all such word pairs. Alternatively, only a prescribed number of high-ranking word pairs may be selected.

<Contents of Processing>

Figure 3:
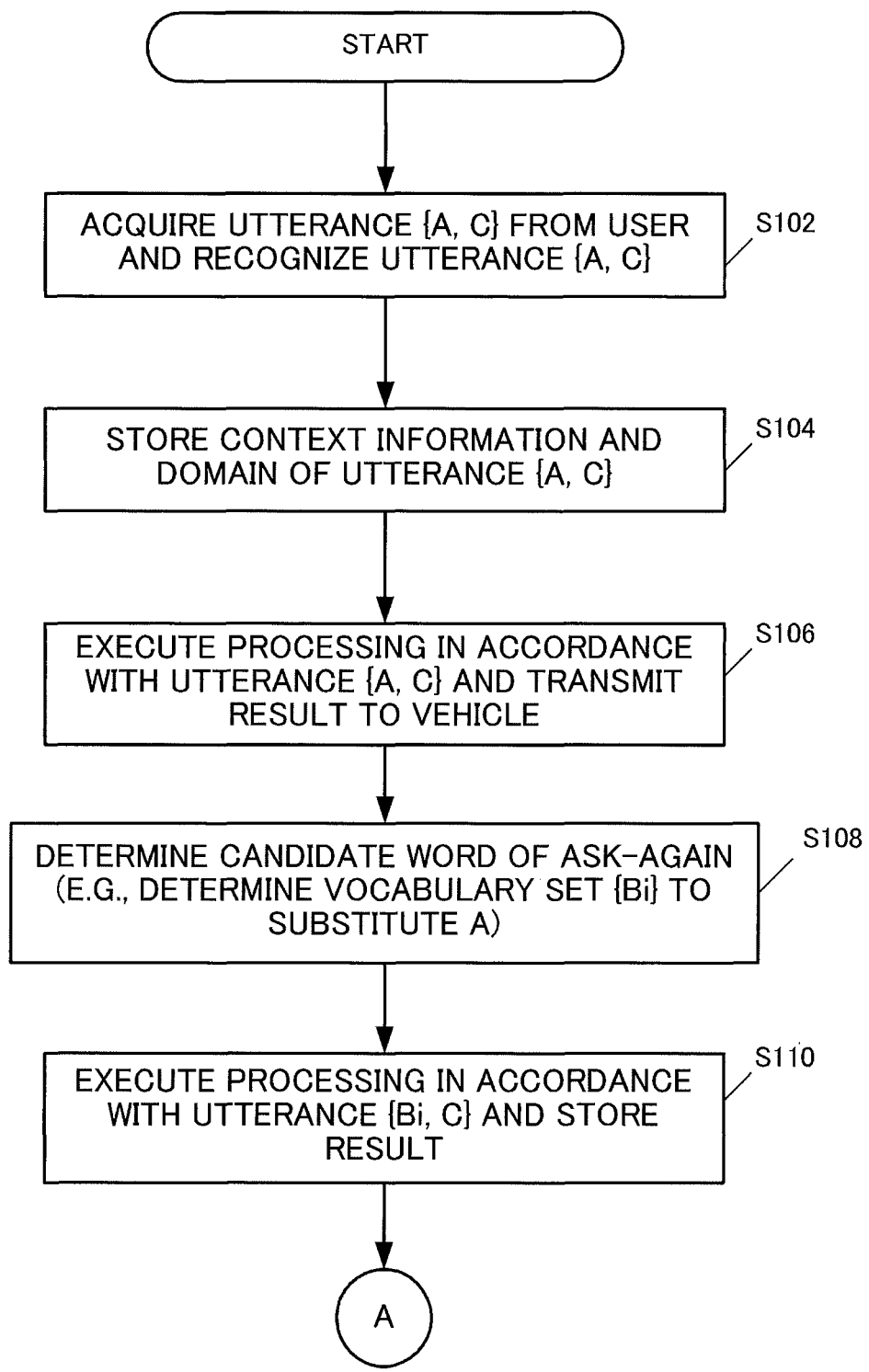
FIG. 3 is a flow chart showing a flow of a voice processing method according to an embodiment.
Figure 4:
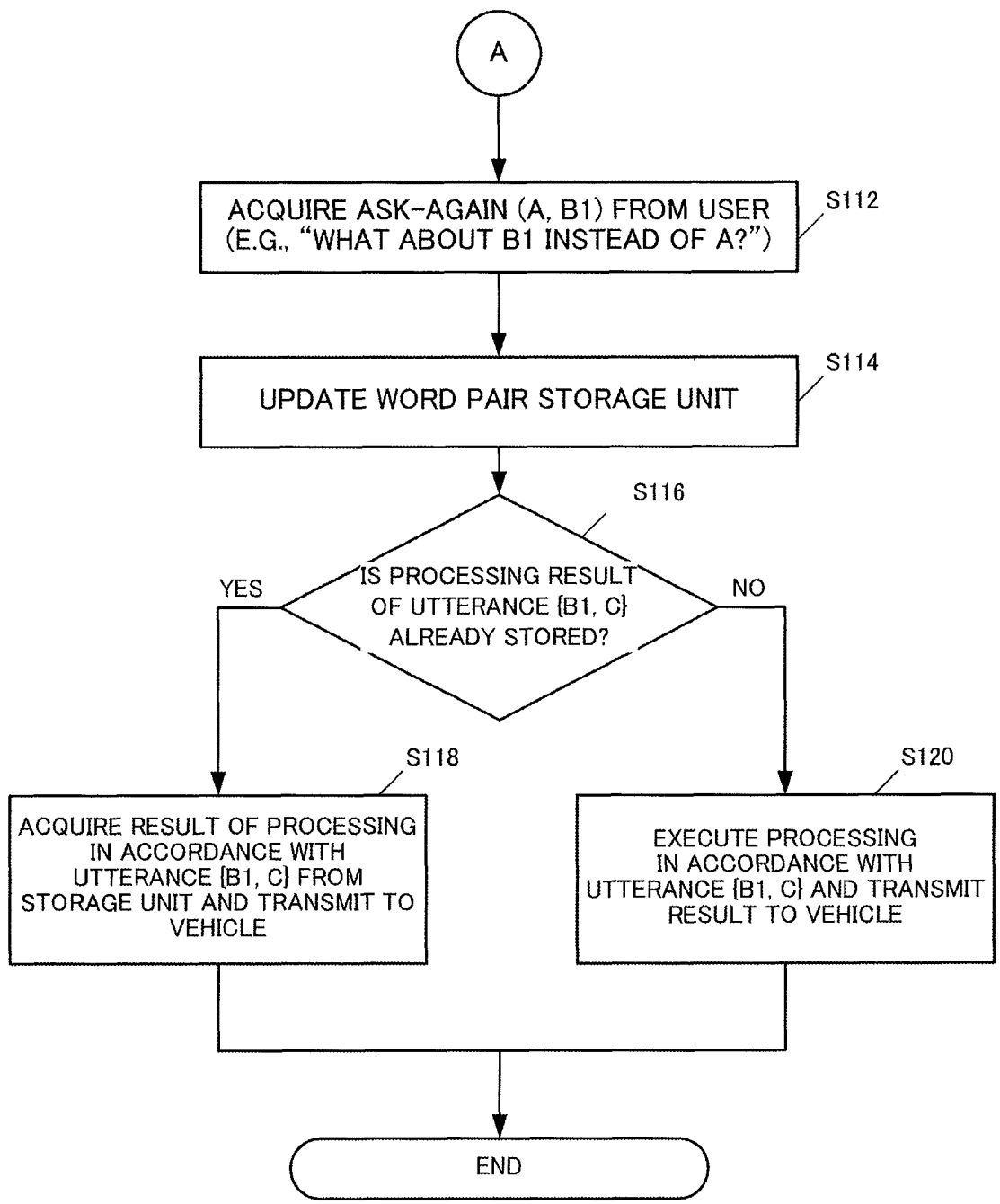
FIG. 4 is a flow chart showing a flow of a voice processing method according to an embodiment.

Processing in the voice processing system according to the present embodiment will be first described with reference to FIGS. 3 and 4. First, in step S102, the voice acquisition unit 110 acquires an utterance of a user and transmits the utterance to the voice recognition unit 210, and the voice recognition unit 210 recognizes contents of the utterance. In this case, it is assumed that an utterance of "Retrieve a route from A to C" has been received from the user. In reality, A and C are specific place names, store names, or the like. In addition, this utterance will be expressed as {A, C} in the following description.

In step S104, the voice recognition unit 210 temporarily stores context information and a domain of each word which are obtained when recognizing the utterance {A, C}.

In step S106, the execution unit 220 executes processing corresponding to the utterance {A, C} and transmits a result thereof to the vehicle 100. Specifically, the execution unit 220 issues a request to obtain a route from A to C with respect to the retrieval server 300 and acquires a result thereof. Subsequently, the execution unit 220 transmits a processing result obtained from the retrieval server 300 to the vehicle 100. At the vehicle 100, the information providing unit 120 provides the user with the processing result.

In step S108, the determination unit 240 determines a candidate word in an ask-again which is assumed with respect to the utterance {A, C}. For example, a set of candidates {Bi} of words to substitute the word A in the utterance {A, C} is determined. Specifically, the determination unit 240 refers to the word pair storage unit 230 and determines, as a candidate word, a word after substitution of which a word before substitution is the word A and which is included in a record of which context information matches the context information (already stored in S104) of the utterance {A, C}. While only candidate words to substitute the word A will be described here, candidate words to substitute the word C are also favorably determined in a similar manner.

In step S110, for each of the set of candidates {Bi} of words to substitute the word A, the execution unit 220 performs processing corresponding to contents of an utterance {Bi, C} or, in other words, processing of "Retrieving a route from Bi to C" and stores a result thereof in the storage apparatus. The retrieval of the route may be performed by issuing a request to the retrieval server 300 in a similar manner to step S102.

In step S112, an utterance of an ask-again from the user is acquired and contents thereof are recognized. A case of an ask-again of "What about a route from B1 instead of A?" by the user is assumed. Such an ask-again is expressed as (A, B1) in the following description. When recognizing the word B1, the voice recognition unit 210 determines attribute information of the word B1 in consideration of context information and domains of the utterance {A, C} stored in step S104. For example, while the word B1 may have a plurality of meanings such as a place name and a store name, the voice recognition unit 210 can take the context information and the like of the utterance {A, C} into consideration and determine that the word B1 in the ask-again (A, B1) represents a place name.

In step S114, the voice processing server 200 updates the word pair storage unit 230. Specifically, the number of occurrences of a record in which the word before substitution is "A", the word after substitution is "B1", and context information is the context information of the utterance {A, C} is incremented by 1. When such a record does not exist, the record may be newly created and the number of occurrences of the record may be set to 1. At this point, the number of occurrences of a record in which the word before substitution is "B1" and the word after substitution is "A" may be incremented by 1. This is because a word pair to be asked again is conceivably replaceable in both directions.

In step S116, the execution unit 220 determines whether or not a processing result of {B1, C} or, in other words, "Retrieving a route from B1 to C" has already been stored (has been prefetched). If so, the process proceeds to step S118, in which the execution unit 220 acquires a result thereof from the storage unit and transmits the result to the vehicle 100. If not, the process proceeds to step S120, in which the processing of {B1, C} is executed and a processing result thereof is transmitted to the vehicle 100. At the vehicle 100, the information providing unit 120 provides the user with the processing result.

<Advantageous Effects of the Present Invention>

According to the present invention, when a request by voice is received from a user, an occurrence of an ask-again is anticipated, and processing in accordance with the anticipated ask-again is executed in advance and a result of the processing is prefetched. Therefore, when the ask-again actually occurs, a result can be sent back immediately without performing processing. As in the present embodiment, although performing processing by issuing a request to an external server takes about several seconds, processing time can be reduced to less than one second by prefetching. In other words, the speed of a response to an ask-again can be increased.

In addition, since a word that is an object of an ask-again is determined based on the number of ask-agains that have actually occurred, estimation accuracy can be increased. When the voice processing server 200 collectively processes voices from a plurality of vehicles 100 as in the present embodiment, since history of a larger number of ask-agains can be stored, estimation with higher accuracy can be performed.

Furthermore, when an ask-again occurs, since attribute information of words included in the ask-again is recognized using context information and domains of an utterance prior to the ask-again, voice recognition with high accuracy can be performed. While acquired voice in a vehicle may become unclear due to the influence of road noise and the like, such use of context information enables voice recognition to be performed with high accuracy even in a vehicle.

<Modifications>

While a word that is an object of an ask-again is estimated based on the number of ask-agains that have actually occurred in the embodiment described above, a method of estimating a word that is an object of an ask-again is not limited thereto. For example, the determination unit 240 may be configured to include a vocabulary dictionary and to estimate, as a word that is an object of an ask-again, a word of which a degree of similarity with a word included in an utterance prior to the ask-again is equal to or higher than a threshold in the context of the utterance. Even in this case, a similar effect to that described above can be produced.

In addition, it is also favorable to emphasize history of a user performing the utterance when estimating a word that is an object of an ask-again. While the voice processing server 200 stores the number of occurrences of ask-agains obtained from various vehicles (users) in the word pair storage unit 230 in the description given above, the voice processing server 200 may count the number of ask-agains for each user and estimate an ask-again in accordance with the number of ask-agains of each user. Accordingly, estimation reflecting characteristics of each user can be performed.

While use in a vehicle of the voice processing system according to the present invention is assumed in the embodiment described above, embodiments in which the voice processing system is used are not limited to the inside of an vehicle and the voice processing system can be used in any environment. In addition, while a so-called center-type voice processing system in which a voice acquisition unit (a microphone) is provided in a vehicle and a voice recognition unit and an execution unit are provided in a server has been described as an example, the present invention may be implemented as a mode in which all of these functions are included in a single apparatus or by a configuration in which functions are shared in a different manner as described above.

What is claimed is:

1. A voice processing system, comprising:
   a voice acquisition unit configured to acquire a first request from a user, the first request including a first word;
   a voice recognition unit configured to recognize contents of the first request acquired by the voice acquisition unit;
   an execution unit configured to execute processing based on a result of the voice recognition unit; and
   a determination unit configured to determine a candidate of a second word assumed to substitute the first word, based on the first word, wherein
   after the voice acquisition unit acquires the first request including the first word and the voice recognition unit recognizes the request including the first word:
      (a) the execution unit executes the first request including the first word and provides the user with a first processing result, and
      (b) the determination unit determines the second word that is assumed to be a substitute candidate of the first word, based on the first word, and the execution unit also executes a second request including the second word instead of the first word and stores a processing result of the second request in a storage unit,
   wherein after the voice acquisition unit acquiring the first request including the first word from the user, the determination unit stores a number of times a request including the second word instead of the first word has been acquired from the user for each pair of the first word and the second word, and determines a word of which the number of times is equal to or larger than a threshold among words each forming a pair with the first word, as the substitute candidate of the first word, and
   wherein, after acquiring from the user a further request including a third word instead of the request including the first word after making the first request including the first word, the further request being an ask-again whereby the first word is replaced by the third word, the voice recognition unit determines an attribute of the third word from context information of the first request including the first word and recognizes the third word, and the execution unit provides the user with a second processing result of the further request including the third word using the context information so that the second processing result coincides with the determined attribute of the third word.

2. The voice processing system according to claim 1, wherein
   the voice recognition unit recognizes the further request including the third word instead of the first word after recognizing the request including the first word, and the execution unit acquires the second processing result from a storage location in the storage unit and provides the user with the second processing result.

3. The voice processing system according to claim 1, wherein
   the number of times the request including the second word instead of the first word has been acquired from the user includes the number of times an utterance instructing the request including the second word instead of the first word to be made has been acquired.

4. The voice processing system according to claim 1, wherein
   the determination unit stores the first word and the substitute candidate of the first word in association with each other and determines a word stored in association with the first word as a substitute candidate of the first word.

5. The voice processing system according to claim 1, wherein the first request is a single request.

6. A voice processing method, comprising:
   a voice acquisition step of acquiring a first request from a user, the first request including a first word;
   a voice recognition step of recognizing contents of the first request acquired in the voice acquisition step;
   a processing execution step of executing processing based on a result of the voice recognition step; and
   a substitute candidate word determination step of determining a candidate of a second word assumed to substitute the first word, based on the first word, wherein
   after the first request including the first word is acquired and recognized:

(a) the first request including the first word is executed and the user is provided with a first processing result, and (b) the second word that is assumed to be a substitute candidate of the first word, based on the first word, is determined, and a second request including the second word instead of the first word is also executed and a processing result of the second request is stored;

a step of storing, after acquiring the first request from the user, the number of times a request including the second word instead of the first word has been acquired from the user for each pair of the first word and the second word in a table, wherein in the substitute candidate word determination step, a word of which the number of times is equal to or larger than a threshold among words each forming a pair with the first word is determined as a substitute candidate of the first word by referring to the table; and wherein, after acquiring from the user further request including a third word instead of the first request including the first word after making the request including the first word, the further request being an ask-again whereby the first word is replaced by the third word, determining an attribute of the third word from context information of the first request including the first word and recognizing the third word, and providing the user with a second processing result of the further request including the third word using the context information so that the second processing result coincides with the determined attribute of the third word.

7. The voice processing method according to claim 6, further comprising:

recognizing the further request including the third word instead of the first word after recognizing the request including the first word, and the acquiring the second processing result from a storage location in the storing, and provides the user with the second processing result.

8. The voice processing method according to claim 6, wherein the number of times the request including the second word instead of the first word has been acquired from the user includes the number of times an utterance instructing the request including the second word instead of the first word to be made has been acquired.

9. The voice processing method according to claim 6, further comprising a step of storing the first word and a substitute candidate of the first word in association with each other in advance, wherein in the substitute candidate word determination step, a word stored in association with the first word is determined as a substitute candidate of the first word.

10. A non-transitory computer-readable storage medium storing a program causing a computer to execute the respective steps of the method according to claim 6.

11. The voice processing method according to claim 6, wherein the first request is a single request.

* * * * *